(No Model.)
E. R. OSGOOD.
SCREW CLAMP.
No. 247,211. Patented Sept. 20, 1881.
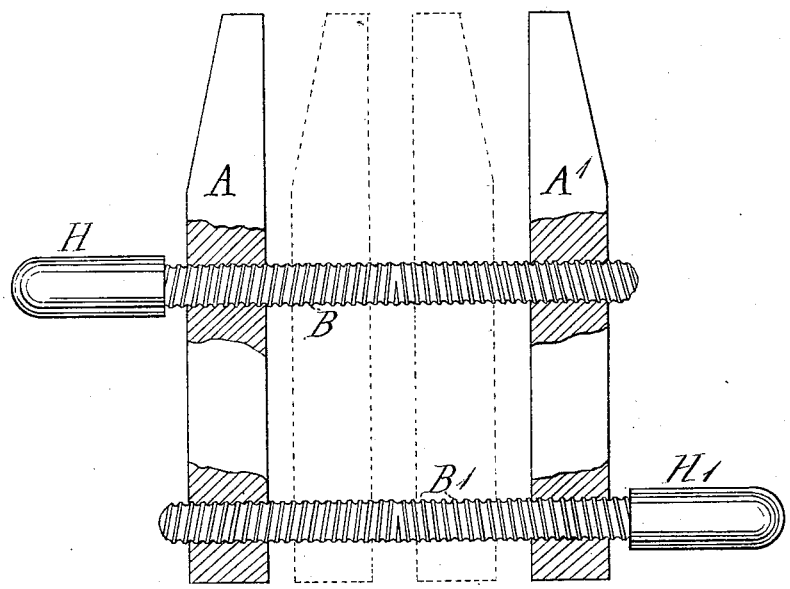
Attest:
John Buckler.
A. M. Pierce.
E. R. Osgood.
Inventor:
By Worth Osgood,
Attorney.

UNITED STATES PATENT OFFICE.

ELIJAH R. OSGOOD, OF COLUMBUS, OHIO.

SCREW-CLAMP.

SPECIFICATION forming part of Letters Patent No. 247,211, dated September 20, 1881.

Application filed February 26, 1881. (No model.)

*To all whom it may concern:*

Be it known that I, ELIJAH R. OSGOOD, of Columbus, county of Franklin, and State of Ohio, have invented certain new and useful Improvements in Screw-Clamps, of which the following is a full, clear, and exact description, reference being had to the accompanying drawing, and to the letters of reference marked thereon.

My invention has relation to that class of devices employed by wood-workers and others, and ordinarily denominated "screw-clamps," the same being used for clamping and holding pieces or parts together for various purposes, as is well understood.

The object of my invention is to produce a simple, cheap, and durable clamp, in which the jaws may be made to move toward or from each other in parallel directions by simply turning the clamp while holding the handles of the screws; or, if desired, a suitable inclination may be given the jaws by turning one screw more than the other, the same as in the most ordinary forms of screw-clamps, so that the jaws may be made to bite at the points.

To accomplish all of this the invention consists in screw-tapping both jaws through and through in two places, the screw-threads in the opposite taps being oppositely inclined, so that one shall receive the right-hand thread on the screw and the other the left-hand thread, and in these taps mounting the two screws, each having a projecting handle and each provided with both a right and a left hand thread, as will be hereinafter more fully explained.

Heretofore in the style of clamps to which my invention relates it has been customary to provide the two independent movable jaws with screws, in each of which the thread is continuous in one direction; and in use these old forms offer great difficulty in causing the two jaws to assume a parallel position, requiring a careful manipulation of the screws, (first one and then the other.) This not only makes it difficult to insure a proper bearing of the jaws upon the material being clamped, but renders it difficult and unhandy to adjust the clamp to the proper width before applying it.

In the accompanying drawing I have represented a partial section and elevation of a screw-clamp constructed and arranged to operate in accordance with my improvements and involving my invention.

A A' are the two jaws of the clamp, which, by being brought together, are made to hold the articles desired between their projecting ends.

B B' are the two screws by which the jaws are made to approach or recede from each other. Each of these screws is provided with a suitable handle, H H', and each screw has both a right and left hand thread, one extending from the handle to about the middle and the other from this point out to the end. The handles are located on opposite sides of the clamp, and the parts arranged as shown in the drawing. By grasping the handles H H' and turning one over the other it is plain that the two jaws will be made to approach or recede from each other, according to the direction in which the clamp is turned; and if the two jaws are parallel at the start, they will continue so throughout the adjustment, the two screws being made of same size and the pitch of the threads being alike in both. In this way the jaws may be easily and quickly adjusted to the desired distance from each other; and it will be observed that as one jaw recedes from the center of the screw the other recedes with equal rapidity, so that the setting of the clamp can be effected in half the time or by half the number of turns as would be required in case the screw-threads were continuous in one direction. What is true of the receding of the two jaws is also true of the approaching or movement in the reverse direction. The two jaws, being parallel, will pinch the article being clamped to better advantage than when they are not so located with respect to each other.

In some cases it is desirable to make the jaws bite at the points, and in such case, by holding one screw fast and twisting the other, my improved clamp may be set the same as the older forms previously referred to. After placing the clamp in position for use, by turning both screws equally the two jaws may be made to bear equally and with any degree of pressure. The jaws being once set upon the screws so that they are parallel, they will so remain until one screw is twisted more than the other.

The ease and rapidity with which the jaws may set and the certainty of preserving their parallel position are among the advantages of the improved device which will recommend it for use.

The jaws and screws may be made of wood or metal and of any desired size, depending upon the uses for which they are intended.

Having now fully described my invention, what I claim as new, and desire to secure by Letters Patent, is—

The herein-described improved screw-clamp, consisting of the two movable jaws A A' and the two screws B B', the latter having each a right and left hand thread passing entirely through both jaws, engaging with the screw-threads therein, and having each a projecting handle, the handles being located upon opposite sides of the clamping-jaws, as explained, and the whole being arranged to operate substantially as and for the purposes set forth.

In testimony that I claim the foregoing I have hereunto set my hand in the presence of two witnesses.

ELIJAH R. OSGOOD.

Witnesses:
C. C. JONES,
JOHN H. SHARP.